(12) United States Patent
Ding et al.

(10) Patent No.: US 12,378,130 B2
(45) Date of Patent: Aug. 5, 2025

(54) METHODS OF SYNTHESIS OF MESOPOROUS NANO-SIZED ZEOLITE BETA BY HYDROTHERMAL TREATMENT AND USES THEREOF

(71) Applicant: Saudi Arabian Oil Company, Dhahran (SA)

(72) Inventors: Lianhui Ding, Dhahran Camp (SA); Sameer Al-Ghamdi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 820 days.

(21) Appl. No.: 17/570,075

(22) Filed: Jan. 6, 2022

(65) Prior Publication Data
US 2023/0212018 A1    Jul. 6, 2023

(51) Int. Cl.
| C01B 39/46 | (2006.01) |
| B82Y 30/00 | (2011.01) |
| B82Y 40/00 | (2011.01) |
| C10G 47/02 | (2006.01) |

(52) U.S. Cl.
CPC .............. *C01B 39/46* (2013.01); *C10G 47/02* (2013.01); *B82Y 30/00* (2013.01); *B82Y 40/00* (2013.01); *C01P 2004/64* (2013.01); *C01P 2006/14* (2013.01); *C01P 2006/16* (2013.01)

(58) Field of Classification Search
CPC ....... C01B 39/46; C01B 39/026; C10G 47/02; B82Y 30/00; B82Y 40/00; C01P 2004/64; C01P 2006/14; C01P 2006/16
See application file for complete search history.

(56) References Cited

U.S. PATENT DOCUMENTS

| 8,951,498 | B2 | 2/2015 | Larson et al. |
| 8,969,233 | B2 | 3/2015 | Simon et al. |
| 10,196,465 | B2 | 2/2019 | Han et al. |
| 10,272,418 | B2 | 4/2019 | Pilyungina |
| 10,603,657 | B2 | 3/2020 | Ding et al. |

(Continued)

FOREIGN PATENT DOCUMENTS

| BR | 102018070904 A2 | 5/2020 |
| CA | 2894483 A1 | 6/2014 |

(Continued)

OTHER PUBLICATIONS

Ikuno et al., "Structure-Directing Behaviors of Tetraethylammonium Cations toward Zeolite Beta Revealed by the Evolution of Aluminosilicate Species Formed during the Crystallization Process" J. Am. Chem. Soc. 137, Oct. 2015, 14533-14544 (Year: 2015).*

(Continued)

*Primary Examiner* — Anthony J Zimmer
*Assistant Examiner* — Abdul-Rahman Yusuf Waleed Smari
(74) *Attorney, Agent, or Firm* — Bracewell LLP; Constance G. Rhebergen; Brian H. Tompkins

(57) ABSTRACT

A nano-sized mesoporous zeolite beta composition and processes for the synthesis and use of the nano-sized mesoporous zeolite beta. The nano-sized mesoporous zeolite beta is synthesized using a hydrothermal treatment without drying and calcination of the zeolite prior to or after hydrothermal treatment. A process for hydrocracking a hydrocarbon feedstock using the nano-sized mesoporous zeolite beta is also provided.

18 Claims, 2 Drawing Sheets

(56) References Cited

U.S. PATENT DOCUMENTS

| | | | |
|---|---|---|---|
| 10,626,019 | B2 | 4/2020 | Li et al. |
| 10,773,248 | B2 | 9/2020 | Ding et al. |
| 10,807,078 | B2 | 10/2020 | Eid et al. |
| 10,927,059 | B2 | 2/2021 | Tammana et al. |
| 10,981,160 | B1 | 4/2021 | Tammana et al. |
| 11,007,511 | B2 | 5/2021 | Kobaslija et al. |
| 2018/0333708 | A1 | 11/2018 | Ding et al. |
| 2018/0334390 | A1* | 11/2018 | Ding ................ B01J 35/651 |
| 2020/0156052 | A1* | 5/2020 | Eid ..................... B01J 35/69 |
| 2021/0130178 | A1 | 5/2021 | Al-Shafei et al. |
| 2023/0212019 | A1 | 7/2023 | Ding et al. |

FOREIGN PATENT DOCUMENTS

| | | |
|---|---|---|
| CN | 1123535 C | 10/2003 |
| CN | 101205072 B | 6/2008 |
| CN | 102557065 B | 7/2012 |
| CN | 102936017 B | 2/2013 |
| CN | 107344112 B | 11/2017 |
| CN | 107344113 A | 11/2017 |
| CN | 107628630 B | 1/2018 |
| CN | 108097302 B | 6/2018 |
| CN | 108275695 B | 7/2018 |
| CN | 109721078 A | 5/2019 |

OTHER PUBLICATIONS

Bajaj, Hari C. et al.; "Synthesis of hierarchical nano-crystalline zeolite beta using biomass-derived hard templates" Int. J. Materials Engineering Innovation, vol. 6, No. 1, 2015; pp. 49-58.

Dai, Jiqiang et al.; "Synthesis of zeolite nanocrystals with intercrystal mesoporous using organosilanes as a structure directing agent" Royal Society of Chemistry, RSC Advances Oct. 30, 2016; pp. 1-7.

Ding, Lianhui et al.; "Effect of agitation on the synthesis of zeolite beta and its synthesis mechanism in absence of alkali cations" Microporous and Mesoporous Materials 94 (2006); pp. 1-8.

Ding, Lianhui et al.; "Effect of particle size on the hydrothermal stability of zeolite beta" Microporous and Mesoporous Materials 101 (2007); pp. 432-439.

Ding, Lianhui et al.; "Nanocrystalline zeolite beta: The effect of template agent on crystal size" Materials Research Bulletin 42 (2007); pp. 584-590.

Escola, J.M. et al.; "Synthesis of hierarchical Beta zeolite with uniform mesopores: effect on its catalytic activity for veratrole" Catalysis Today, Feb. 8, 2017; pp. 1-31.

Garcia-Martinez, Javier et al.; "Mesostructured zeolite Y—high hydrothermal stability and superior FCC catalytic performance" Catalysis Science & Technology, Royal Society of Chemistry 2012; pp. 1-8.

Groen, J.C. et al.; "Mesoporosity development in ZSM-5 zeolite upon optimized desilication conditions in alkaline medium" Colloids and Surfaces A: Physicochem Eng. Aspects 241 (2004); pp. 53-58.

Groen, J.C. et al.; "On the introduction of intracrystalline mesoporosity in zeolites upon desilication in alkaline medium" Microporous and Mesoporous Materials 69 (2004); pp. 29-34.

Groen, Johan C. et al.; "Pore size determination in modified micro- and mesoporous materials. Pitfalls and limitations in gas adsorption data analysis" Microporous and Mesoporous Materials 60 (2003); pp. 1-17.

Li, Wenlong et al.; "Facile control of inter-crystalline porosity in the synthesis of size-controlled mesoporous MFI zeolites via in-situ converting silica gel into zeolite nanocrystals for catalytic cracking" Royal Society of Chemistry 2013, CrystEngComm; pp. 1-12.

Ma, Qian et al.; "Development of mesoporous ZSM-5 zeolite with microporosity preservation through induced desilication" J Mater Sci, Springer, Jun. 2, 2020; pp. 1-21.

Mintova, S. et al.; "Variation of the Si—Al ratio in nanosized zeolite Beta crystals" Microporous and Mesoporous Materials 90 (2006); pp. 237-245.

Ogura, Masaru et al.; "Alkali-treatment technique—new method for modification of structural and acid-catalytic properties of ZSM-5 zeolites" Applied Catalysis A: General 219 (2001); pp. 33-43.

Song, Wancang et al.; "Effect of treatment with different bases on the catalytic properties of TS-1/SiO2 extrudates in propylene epoxidation" Microporous and Mesoporous Materials 212 (2015); pp. 48-55.

Xia, Q.-H. et al.; "Crystallization kinetics of nanosized TiB zeolites with high oxidation activity by a dry-gel conversion technique" Materials Chemistry and Physics 89 (2005); pp. 89.98.

Xin, L. et al.; "Surface and Pore Structure Modification of Mesoporous Nano-Zirconia Zeolites" (abstract only); Chinese Journal of Inorganic Chemistry, available as of Nov. 11, 2021 at: https://www.semanticscholar.org/paper/Surface-and-Pore-Structure-Modification-of-Zeolites-Xin-Key/c18bcffa4d5f0b9f0b016ae636f1eb8acab48983; pp. 1-2.

Yin, Xiaoyan et al.; "Hydrothermal synthesis of hierarchical zeolite T aggregates using tetramethylammonium hydroxide as single template" Microporous and Mesoporous Materials 201 (2015); pp. 247-257.

Yu, Ting-Yun et al.; "Synthesis and Characterization of Nanosized ZSM-5 Zeolite with Mesoporous Carbon Nanotube as Templates" Petroleum Science and Technology, 25 (2007); pp. 1125-1133.

Zhang, Ke et al.; "Innovations in hierarchical zeolite synthesis" Catalysis Today 264 (2016); pp. 3-15.

* cited by examiner

METHODS OF SYNTHESIS OF MESOPOROUS NANO-SIZED ZEOLITE BETA BY HYDROTHERMAL TREATMENT AND USES THEREOF

BACKGROUND

Field of the Disclosure

The present disclosure generally relates to nano-sized mesoporous zeolite compositions. More specifically, embodiments of the disclosure relate to the synthesis of such compositions using hydrothermal treatment and the use of such compositions.

Description of the Related Art

Beta zeolites are crystallized aluminosilicates that are widely used in heavy oil conversion processes such as hydrocracking and fluid catalytic cracking processes. In particular, beta zeolites are used in such processes based on considerations of pore structure, stability, and acidity. The feedstock to these processes is a portion of the crude oil that has an initial boiling point of 350° C. and an average molecular weight ranging from about 200 to 600 or greater. Due to the annual deterioration in the properties of crude oil and the increasing demand for clean fuel and petrochemicals, more heavy oils need to be converted using various processes and catalysts such as zeolites.

SUMMARY

Crude oil (for example, heavy crude oil) may be passed through hydro-treating and then hydrocracking catalysts to remove undesired contents, such as sulfur, nitrogen, and metals, and convert high molecular weight hydrocarbons (complex aromatics or unsaturated hydrocarbons) into naphtha, kerosene, gasoline, diesel oil or high-quality lubricating oils. The catalyst used in hydroprocessing has two functions: cracking of high molecular weight hydrocarbons and hydrogenating the unsaturated molecules. Conventional beta zeolites (also referred to as "zeolite beta") have relatively small pore sizes (less than 2 nm) that do not allow the large molecules of heavy oil conversion processes to diffuse in and to react on the active sites located inside the zeolites, thus resulting in a negative impact on the performance of beta zeolite catalysts. This results in low catalytic activity and possible deactivation of the catalyst.

The mass transfer of molecules may be enhanced by increasing the pore sizes and reducing the particle sizes of zeolites, thus improving catalyst performance. In some instances, ordered mesoporous aluminosilicates with larger pore sizes may be used to synthesize a catalyst with relatively larger pore sizes. Additionally, the particle size of the catalyst may be reduced during synthesis to increase external surface and shorten the diffusion path of molecules to thereby increase catalyst performance. However, synthesizing a catalyst having nano-sized particles and mesoporosity is difficult via existing techniques.

Existing synthesis processes for nano-sized beta zeolites present various problems, such as the irregularity of the zeolite catalyst resulting from aggregation of the nano-sized particles and decreased yield of final products due to the need for ion exchange and separation steps to obtained H-form zeolite product or protonic zeolite forms. Existing processes typically require calcination of the zeolite beta before additional treatment, thus removing all the template or structure directing agent (SDA) used for the zeolite synthesis. Such processes may produce an increase in pore volume and average pore size of the zeolite but also result in a decrease in crystallinity that indicates partial destruction of the zeolite structure.

Embodiments of the disclosure include a process for the synthesis of a nano-sized zeolite beta having mesopores (referred as a "meso-nano zeolite beta") using a hydrothermal treatment without drying and calcination of the zeolite. Moreover, the process may synthetize a nano-sized zeolite beta without the use of a structure directing agent (SDA) such as cetrimonium bromide (CTAB). The meso-nano zeolite beta may be used as a catalyst in heavy oil conversion processes such as hydrocracking and fluid catalytic cracking.

As used in the disclosure, the term "mesoporous" refers to a pore size distribution of greater than 2 nanometers (nm) and less than or equal to 50 nm in a zeolitic structure. The term "mesoporous" is distinguishable from "microporous" (pore size distributions in the range of 0.5 to less than 2 nm) and "macroporous" (pore size distributions greater than 50 nm).

In one embodiment, a method for synthesizing a nano-sized mesoporous zeolite beta composition is provided. The method includes mixing silica, a source of aluminum, tetraethylammonium hydroxide, and water to form an aluminosilicate fluid gel and heating the aluminosilicate fluid gel for at a first temperature for a first time period to form a zeolite beta product. The method also includes subjecting the zeolite beta product to a hydrothermal treatment at a pressure and second temperature for a second time period to produce the nano-sized mesoporous zeolite beta composition, such that the zeolite beta product is not calcinated before the hydrothermal treatment.

In some embodiments, the nano-sized mesoporous zeolite beta composition has a pore volume of 1.0 milliliters per gram (ml/g) to 1.5 ml/g. In some embodiments, the nano-sized mesoporous zeolite beta composition has a pore size of 15 nanometers (nm) to 50 nm. In some embodiments, the nano-sized mesoporous zeolite beta composition has a particle size of 10 nanometers (nm) to 100 nm. In some embodiments, the silica is fumed silica. In some embodiments, the source of aluminum is aluminum oxide. In some embodiments, subjecting the zeolite beta product to a hydrothermal treatment at a pressure and second temperature for a second time period to produce a treated zeolite beta product. In some embodiments, the first temperature is in the range of 100° C. to 150° C. and the first time period is in the range of 2 days to 7 days. In some embodiments, the pressure is in the range of 1 bar to 5 bar, the second temperature is in the range of 400° C. to 600° C., and the second time period is in the range of 0.5 hours to 4 hours. In some embodiments, the method includes filtering the nano-sized mesoporous zeolite beta composition, washing the nano-sized mesoporous zeolite beta composition product after the filtering, drying the nano-sized mesoporous zeolite beta composition at a third temperature for a third time period after the washing, and calcinating the nano-sized mesoporous zeolite beta composition at a fourth temperature for a fourth time period after the drying to produce the nano-sized mesoporous zeolite beta composition. In some embodiments, the third temperature is in the range of 80° C. to 150° C., and the third time period is in the range of 3 hours to 8 hours. In some embodiments, the fourth temperature is in the range of 500° C. to 600° C., and the fourth time period is in the range of 3 hours to 8 hours.

In another embodiment, a method for hydrocracking a hydrocarbon feedstock is provided. The method includes contacting the hydrocarbon feedstock with a catalyst containing a nano-sized mesoporous zeolite beta composition under reaction conditions to convert a product stream containing at least 20 weight percent of hydrocarbons with 1 to 4 carbon atoms. The nano-sized mesoporous zeolite beta composition is synthesized by a method that includes mixing silica, a source of aluminum, tetraethylammonium hydroxide, and water to form an aluminosilicate fluid gel and heating the aluminosilicate fluid gel for at a first temperature for a first time period to form a zeolite beta product. The method also includes subjecting the zeolite beta product to a hydrothermal treatment at a pressure and second temperature for a second time period to produce the nano-sized mesoporous zeolite beta composition, such that the zeolite beta product is not calcinated before the hydrothermal treatment.

In some embodiments, the nano-sized mesoporous zeolite beta composition has a pore volume of 1.0 milliliters per gram (ml/g) to 1.5 ml/g, a pore size of 15 nanometers (nm) to 50 nm. In some embodiments, the nano-sized mesoporous zeolite beta composition has a particle size of 10 nanometers (nm) to 100 nm. In some embodiments, the silica is fumed silica. In some embodiments, the source of aluminum is aluminum oxide. In some embodiments, subjecting the zeolite beta product to a hydrothermal treatment at a pressure and second temperature for a second time period to produce a treated zeolite beta product. In some embodiments, the first temperature is in the range of 100° C. to 150° C. and the first time period is in the range of 2 days to 7 days. In some embodiments, the pressure is in the range of 1 bar to 5 bar, the second temperature is in the range of 400° C. to 600° C., and the second time period is in the range of 0.5 hours to 4 hours. In some embodiments, the hydrocarbon feedstock is a heavy fraction having a boiling point greater or equal to 540° C.

In another embodiment, a nano-sized mesoporous zeolite beta composition is provided. The composition includes a plurality of nano-sized mesoporous zeolite particles, each of the plurality of particles having a particle size of 10 nanometers (nm) to 100 nm, a pore volume of 1.0 milliliters per gram (ml/g) to 1.5 ml/g, and a pore size of 15 nanometers (nm) to 50 nm. The plurality of nano-sized mesoporous zeolite particles are synthesized by a method that includes mixing silica, a source of aluminum, tetraethylammonium hydroxide, and water to form an aluminosilicate fluid gel and heating the aluminosilicate fluid gel for at a first temperature for a first time period to form a zeolite beta product. The method also includes subjecting the zeolite beta product to a hydrothermal treatment at a pressure and second temperature for a second time period to produce the nano-sized mesoporous zeolite beta composition, such that the zeolite beta product is not calcinated before the hydrothermal treatment.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiment of the disclosure include a meso-nano zeolite beta composition and processes for the synthesis and use of the meso-nano zeolite beta. The process includes synthesis of the meso-nano zeolite beta using a hydrothermal treatment without drying and calcination of the zeolite prior to hydrothermal treatment. Advantageously, the synthetized meso-nano zeolite beta has improved crystallinity and mesoporosity as compared to conventional beta zeolites and synthesis processes. The improved crystallinity and mesoporosity may result in improved catalytic performance in heavy oil conversion processes such as hydrocracking and fluid catalytic cracking. Moreover, the synthesis processes described in the disclosure result in reduced cost and complexity (for example, number of synthesis steps) as compared to conventional processes. The resulting meso-nano zeolite beta composition is an H-form meso-nano zeolite beta.

Figure 1:
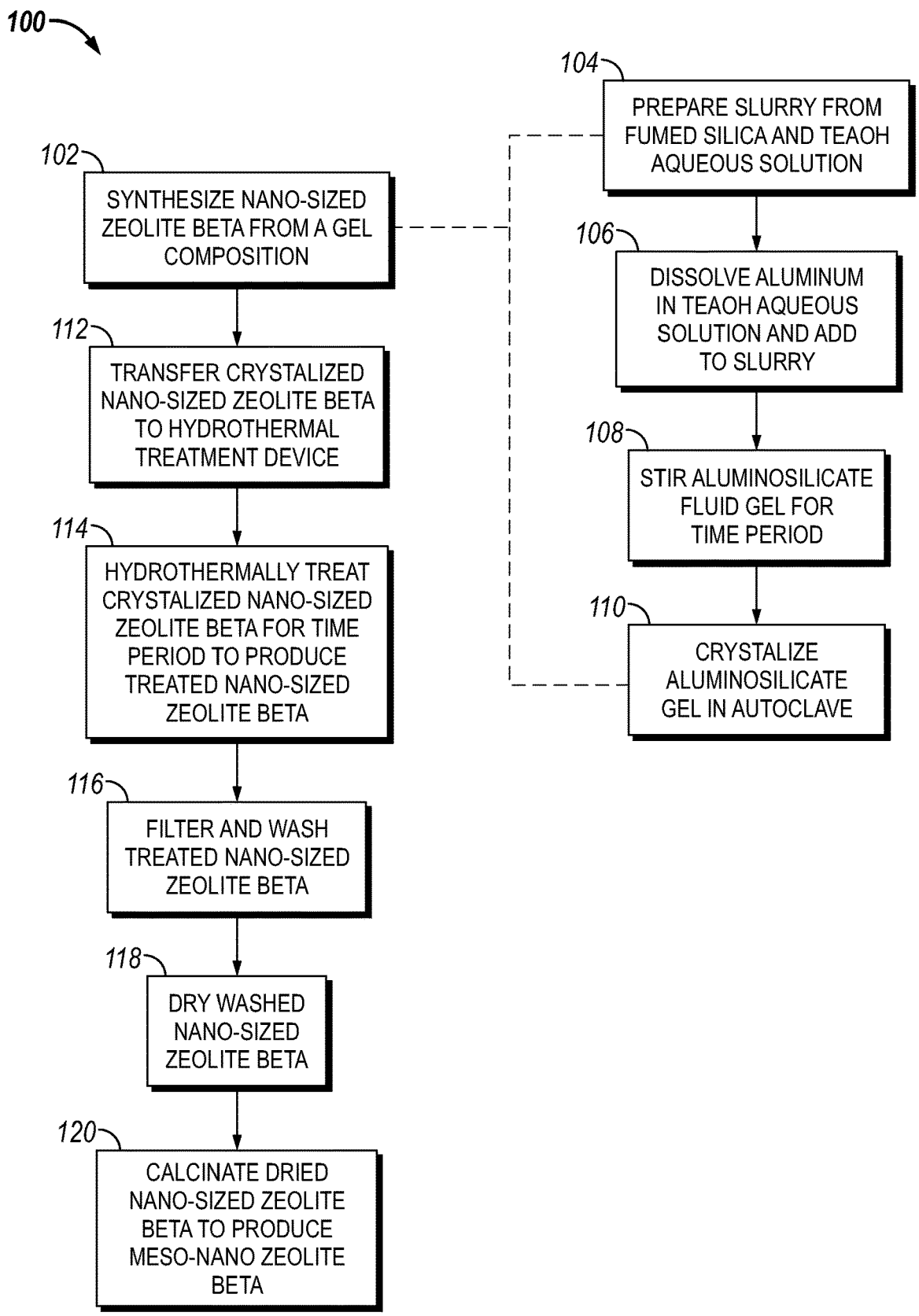
FIG. 1 is a block diagram of a process for synthesizing a meso-nano zeolite beta in accordance with an embodiment of the disclosure.

FIG. 1 depicts a process 100 for synthesizing a meso-nano zeolite beta in accordance with an embodiment of the disclosure. Initially, a nano-sized zeolite beta may be synthesized from a gel composition (block 102). The gel composition may have the following molar ratios: about 20 to about 500 moles of fumed silica ($SiO_2$); about 15 to about 40 moles of tetraethylammonium hydroxide ($C_8H_{21}NO$, referred to herein as "TEAOH") to 1 mole of aluminum (for example, a source such as gamma alumina ($\gamma$-$Al_2O_3$)) and about 17 moles to about 700 moles of $H_2O$. In such embodiments, the fumed silica may be Aerosil® 200 available from Evonik Industries AG of Essen, German. Degussa. In other embodiments, the silica may be colloidal silica. In some embodiments, the source of aluminum is metal aluminum. In some embodiments, the source of aluminum may be aluminum powder. In some embodiments the TEAOH and $H_2O$ may be provided as a TEAOH solution. In some embodiments, the TEAOH solution may have a concentration in the range of 20 weight % (wt %) to 40 wt %. For example, the TEAOH solution may be a 35 weight % (wt %) TEAOH aqueous solution, such as available from MilliporeSigma of Burlington, Massachusetts, USA. In some embodiments, additional water ($H_2O$) may be used in addition to the water in the TEAOH aqueous solution to reach the desired amount of moles.

The nano-sized zeolite beta may be synthesized by preparing a slurry from the fumed silica and TEAOH aqueous solution (block 104) in the molar ratios described above. Next, the alumina may be dissolved in a TEAOH aqueous solution and added to the slurry to form an aluminosilicate fluid gel (block 106). The aluminosilicate fluid gel may be stirred for a time period of about 4 hours at ambient temperature (block 108). The aluminosilicate fluid gel may then be transferred to an autoclave, such as a polytetrafluoroethylene (PTFE) lined stainless steel autoclave. The aluminosilicate fluid gel may be allowed to crystalize in the autoclave at a static state of a temperature of 100° C. to 150° C. for a time period of 2 days to 7 days (block 110) to produce a crystalized nano-sized zeolite beta.

The crystalized nano-sized zeolite beta may be transferred to a hydrothermal treatment device without drying, calcination, or both (block 112). The crystalized nano-sized zeolite beta may be hydrothermally treated (block 114) using a steam at a pressure of 1 bar to 5 bar and a temperature of 400° C. to 600° C. for a time period of about 0.5 hours to 5 hours to produce a meso-nano zeolite beta. In some embodiments, the meso-nano zeolite beta produced after the hydrothermal treatment may be directly used in catalyst applications without any washing, drying, or calcination. For example, the meso-nano zeolite beta produced after the hydrothermal treatment may be separated or filtered and directly used in catalyst applications. In such embodiments, the process for synthesizing a meso-nano zeolite beta may consist of the steps described above (that is, 102, 112, and 114).

In other embodiments, the product from the hydrothermal treatment may be washed 2 to 4 times using deionized water, dried in an oven at a temperature of 80° C. to 150° C. for a time period of about 3 hours to 8 hours, and calcinated in an oven at a temperature of 500° C. to 600° C. for a time period of about 3 hours to 8 hours.

Figure 2:
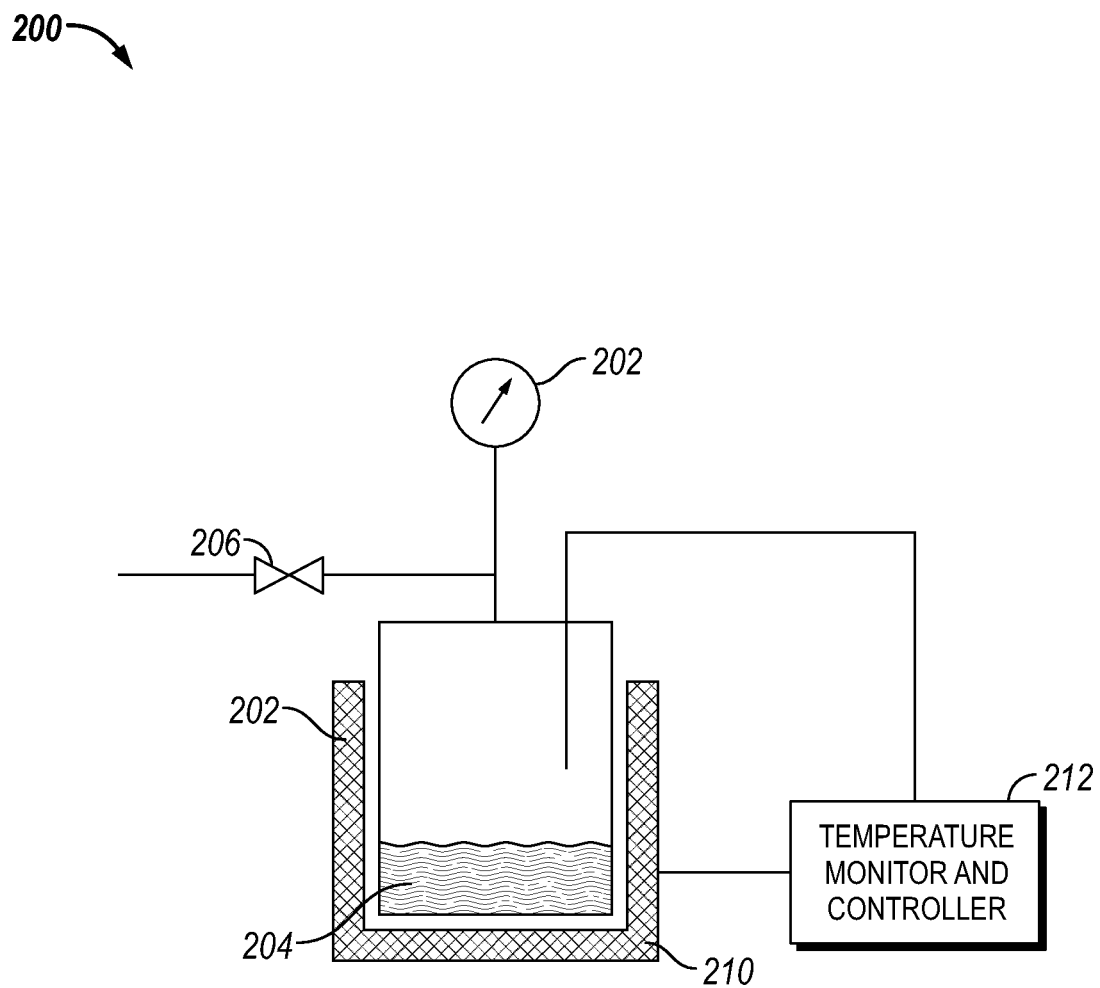
FIG. 2 is a schematic diagram of a hydrothermal treatment device or synthesizing a meso-nano zeolite beta in accordance with an embodiment of the disclosure.

FIG. 2 depicts an example hydrothermal treatment device 200 in accordance with an embodiment of the disclosure. The hydrothermal treatment device 200 may include a vessel 202 containing the crystalized nano-sized zeolite beta 204, a needle valve 206, a pressure gauge 208, a heater 210, and a temperature monitor and controller 212. The heater 210 heats the vessel 202 and is controlled by the temperature monitor and controller 212. The controller 212 may monitor (directly or indirectly) the temperature inside the vessel 202. The pressure gauge 208 provides an indication of the steam pressure inside the vessel 202. The steam pressure inside the vessel 202 may be controlled by the needle valve 206. For example, if the steam pressure is greater than desired, the needle valve may be opened to release excess steam and lower the pressure.

The meso-nano zeolite beta produced by the process illustrated in FIG. 1 and described infra may have the following properties: a particle size of 10 nanometers (nm) to 100 nm; a surface area greater than 510 meters squared per gram (m²/g), such as in the range of 510 m²/g to 567 m²/g; a pore volume of 1.0 milliliters per gram (ml/g) to 1.5 ml/g; a pore size of 15 nm to 50 nm; and a relatively crystallinity of greater than 100%, such as in the range of 108% to 139%. As used in this disclosure, pore volume refers to the total pore volume measured. Additionally, the resulting meso-nano zeolite beta produced by the process illustrated in FIG. 1 and described infra is an H-form meso-nano zeolite beta.

The combination of nano-particle sizes and mesoporosity of the produced meso-nano zeolite beta may enhance the diffusion of large molecules inside the zeolite structure due to larger accessible active sites and faster and easier mass transfer. Additionally, the combined nano-particle sizes and mesoporosity increases the hydrothermal stability and the external surface area which will provides improved activity of selectivity of the catalyst for heavy oil conversion processes as compared to existing zeolite catalysts.

A meso-nano zeolite beta synthesized according to a process of the present disclosure and having the properties described in the disclosure may be used as in a process for hydrocracking a hydrocarbon feedstock. A process for hydrocracking a hydrocarbon feedstock using a meso-nano zeolite beta in accordance with an embodiment of the disclosure may include contacting the hydrocarbon feedstock with a catalyst containing a meso-nano zeolite beta under reaction conditions to produce a product stream. In some embodiments, the hydrocarbon feedstock may include a "heavy" fraction having a boiling points of 540° C. or above (540° C.+). As compared to conventional catalysts and processes, the meso-nano zeolite beta may increase the conversion of the 540° C.+ fraction into lighter fractions (for example, paraffinic and naphthenic fractions) and thereby increase olefin yields and profitability. The lighter fractions may be more easily converted by steam cracking to produce a greater yield of light olefins.

The reaction conditions hydrocracking the hydrocarbon feedstock may include a temperature ranging from 250° C. to 420° C., a liquid hourly space velocity ranging from 0.5 per hour to 10 per hour, and a hydrogen to oil volume ratio ranging from 500 to 2000. The reaction conditions may include a temperature ranging from 250° C. to 400° C., or from 250° C. to 375° C., or from 300° C. to 420° C., or from 325° C. to 400° C. The reaction conditions may include a liquid hourly space velocity ranging from 0.5 per hour to 8 per hour, or from 0.5 per hour to 5 per hour, or from 0.5 per hour to 2 per hour. The reaction conditions may include a hydrogen to oil volume ratio ranging from 500 to 1800, or from 500 to 1500, or from 700 to 1800, or from 700 to 1500. In certain embodiments, the hydrocarbon feedstock has at least 60 wt % of components with a boiling point ranging from 180-540° C. In certain embodiments, the hydrocarbon feedstock has at least 70 wt % of components with a boiling point ranging from 180-540° C. In certain embodiments, the hydrocarbon feedstock has at least 80 wt % of components with a boiling point ranging from 180-540° C.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

An example meso-nano zeolite beta synthesized by an embodiment of the disclosure was compared to a reference conventional nano-zeolite beta (referred to as "Ref-nanobeta") and a reference hydrothermally treated nano-sized zeolite beta (referred to as "Ref-HT-nanobeta").

The conventional nano-zeolite beta ("Ref-nanobeta") and reference hydrothermally treated nano-sized zeolite beta ("Ref-HT-nanobeta") were produced using the following process:

1. A nano-sized zeolite beta was synthesized with a precursor solution having a molar composition of 30 moles of TEAOH: 50 moles of $SiO_2:Al_2O_3$: 750 moles of $H_2O$. The solution was prepared by dissolving 0.27 g of metal aluminum powder in 25 g of 35% TEAOH solution and stirring the aluminum-TEAOH mixture at room temperature for one hour to form a clear solution. A slurry was formed by mixing 15 g of fumed silica with 38 g of 35% TEAOH solution. The slurry was mixed with the aluminum-TEAOH mixture to form an aluminosilicate gel. The aluminosilicate gel was stirring in a beaker at room temperature for 4 hours. The aluminosilicate gel was transferred to a PTFE-lined autoclave and heated in an oven at a temperature of 140° C. for 3 days.
2. The autoclave was quenched and the solid product was separated from the liquid using a centrifuge at 12,000 revolutions-per-minute (rpm). The separated solid was washed with distilled water, dried at 110° C. for 8 hours, and then calcinated at 600° C. for 4 hours to produce the conventional nano-zeolite beta ("Ref-nanobeta").

3. The conventional nano-zeolite beta was then hydrothermally treated in a hydrothermal treatment device at a gauge pressure of 1 bar and a temperature of 550° C. for 1 hour to produce the reference hydrothermally treated nano-sized zeolite beta ("Ref-HT-nanobeta").

The example meso-nano zeolite beta was synthesized according to the following embodiment of the disclosure:

1. A nano-sized zeolite beta was synthesized with a precursor solution having a molar composition of 30 moles of TEAOH: 50 moles of $SiO_2$:$Al_2O_3$: 750 moles of $H_2O$. The solution was prepared by dissolving 0.27 g of metal aluminum powder in 25 g of 35% TEAOH solution and stirring the aluminum-TEAOH mixture at room temperature for one hour to form a clear solution. A slurry was formed by mixing 15 g of fumed silica with 38 g of 35% TEAOH solution. The slurry was mixed with the aluminum-TEAOH mixture to form an aluminosilicate gel. The aluminosilicate gel was stirring in a beaker at room temperature for 4 hours. The aluminosilicate gel was transferred to a PTFE-lined autoclave and heated in an oven at a temperature of 140° C. for 3 days.

2. The nano-zeolite beta product from the autoclave was hydrothermally treated in a hydrothermal treatment device at a gauge pressure of 1 bar and for 1 hour at three different temperatures to synthesize three products. The nano-zeolite beta was hydrothermally treated at 500° C. to produce an example meso-nano zeolite beta referred to as "NZ-HT-1." The nano-zeolite beta was hydrothermally treated at 550° C. to produce an example meso-nano zeolite beta referred to as "NZ-HT-2." Finally, the nano-zeolite beta was hydrothermally treated at 600° C. to produce an example meso-nano zeolite beta referred to as "NZ-HT-3."

The relative crystallinity of the various zeolite betas were analyzed by x-ray diffraction (XRD) using a diffractometer, such as a Rigaku Ultima IV multi-purpose diffractometer with a copper X-ray tube available from Rigaku Corporation of Tokyo, Japan. The scanning range was set between 2° to 50° in 2θ Bragg-angles with a step size of 0.04° and a total counting time of 1° per minute. The crystallinity percentage was calculated by PANalytical High Score Plus software available from Malvern Panalytical of Mavern, Worcestershire, United Kingdom, through the comparison of the area under the most intense diffraction peaks to that of patterns of a reference zeolite beta.

The properties of conventional nano-zeolite beta ("Ref-nanobeta"), the reference hydrothermally treated nano-sized zeolite beta ("Ref-HT-nanobeta"), and the meso-nano zeolite betas NZ-HT-1, NZ-HT-2, and NZ-HT-3 are summarized below in Table 1:

TABLE 1

PROPERTIES OF REFERENCE NANO-ZEOLITE BETAS AND MESO-NANO ZEOLITE BETAS

| Hydrothermal treatment condition | Sample name | | | | |
|---|---|---|---|---|---|
| | Ref-nanobeta | Ref-HT-nanobeta | NZ-HT-1 | NZ-HT-2 | NZ-HT-3 |
| Temperature (° C.) | | | 500 | 550 | 600 |
| Pressure (gauge, bar) | | | 1 | 1 | 1 |
| Time (hour) | | | 1 | 1 | 1 |
| Surface area ($m^2$/g) | 510 | 576 | 567 | 540 | 510 |
| Pore volume (ml/g) | 0.896 | 0.93 | 1.28 | 1.19 | 1.18 |
| Average pore size (nm) | 7.0 | 6.43 | 9.0 | 8.8 | 9.3 |
| Relative crystallinity (%) | 100 | 89 | 139 | 126 | 108 |

As shown in Table 1, the pore volume of the meso-nano zeolite betas were significantly increased as compared to the conventional zeolite betas, indicating the generation of more mesopores. Additionally, the crystallinity of the meso-nano zeolite betas was significantly greater, indicating improved preservation of the zeolite structure during the hydrothermal treatment. The calcination of the Ref-HT-nanobeta before hydrothermal treatment removes the TEAOH template. In contrast to the Ref-HT-nanobeta, the TEAOH template was preserved inside the zeolite cages and channels during hydrothermal treatment. The preserved template preserves the zeolite structure and enhances the zeolite crystallinity.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method for synthesizing a nano-sized mesoporous zeolite beta composition, comprising:
    mixing silica, a source of aluminum, tetraethylammonium hydroxide, and water to form an aluminosilicate fluid gel;
    heating the aluminosilicate fluid gel at a first temperature for a first time period to form a zeolite beta product;
    subjecting the zeolite beta product to a hydrothermal treatment at a pressure and second temperature for a second time period to produce the nano-sized mesoporous zeolite beta composition without the use of a structure directing agent (SDA), wherein the zeolite beta product is not dried and calcinated before the hydrothermal treatment, wherein the nano-sized mesoporous zeolite beta composition has a relative crystallinity of greater than 100%.

2. The method of claim 1, wherein the nano-sized mesoporous zeolite beta composition has a pore volume of 1.0 milliliters per gram (ml/g) to 1.5 ml/g.

3. The method of claim 1, wherein the nano-sized mesoporous zeolite beta composition has a pore size of 15 nanometers (nm) to 50 nm.

4. The method of claim 1, wherein the nano-sized mesoporous zeolite beta composition has a particle size of 10 nanometers (nm) to 100 nm.

5. The method of claim 1, wherein the silica comprises fumed silica.

6. The method of claim 1, wherein the source of aluminum is aluminum oxide.

7. The method of claim 1, wherein the first temperature is in the range of 100° C. to 150° C. and the first time period is in the range of 2 days to 7 days.

8. The method of claim 1, wherein the pressure is in the range of 1 bar to 5 bar, the second temperature is in the range of 400° C. to 600° C., and the second time period is in the range of 0.5 hours to 4 hours.

9. The method of claim 1, comprising:
filtering the nano-sized mesoporous zeolite beta composition;
washing the nano-sized mesoporous zeolite beta composition after the filtering;
drying the nano-sized mesoporous zeolite beta composition at a third temperature for a third time period after the washing; and
calcinating the nano-sized mesoporous zeolite beta composition at a fourth temperature for a fourth time period after the drying.

10. The method of claim 9, wherein the third temperature is in the range of 80° C. to 150° C., and the third time period is in the range of 3 hours to 8 hours.

11. The method of claim 9, wherein the fourth temperature is in the range of 500° C. to 600° C., and the fourth time period is in the range of 3 hours to 8 hours.

12. A method for hydrocracking a hydrocarbon feedstock, the method comprising:
contacting the hydrocarbon feedstock with a catalyst containing a nano-sized mesoporous zeolite beta composition under reaction conditions to convert a product stream containing at least 20 weight percent of hydrocarbons with 1 to 4 carbon atoms, wherein the nano-sized mesoporous zeolite beta composition is synthesized by a method comprising the steps of:
mixing silica, a source of aluminum, tetraethylammonium hydroxide, and water to form an aluminosilicate fluid gel;
heating the aluminosilicate fluid gel at a first temperature for a first time period to form a zeolite beta product;
subjecting the zeolite beta product to a hydrothermal treatment at a pressure and second temperature for a second time period to produce the nano-sized mesoporous zeolite beta composition without the use of a structure directing agent (SDA), wherein the zeolite beta product is not dried and calcinated before the hydrothermal treatment, wherein the nano-sized mesoporous zeolite beta composition has a relative crystallinity of greater than 100%.

13. The method of claim 12, wherein the nano-sized mesoporous zeolite beta composition has a pore volume of 1.0 milliliters per gram (ml/g) to 1.5 ml/g, a pore size of 15 nanometers (nm) to 50 nm, and a particle size of 10 nanometers (nm) to 100 nm.

14. The method of claim 12, wherein the silica comprises fumed silica.

15. The method of claim 12, wherein the source of aluminum is aluminum oxide.

16. The method of claim 12, wherein the first temperature is in the range of 100° C. to 150° C. and the first time period is in the range of 2 days to 7 days.

17. The method of claim 12, wherein the pressure is in the range of 1 bar to 5 bar, the second temperature is in the range of 400° C. to 600° C., and the second time period is in the range of 0.5 hours to 4 hours.

18. The method of claim 12, wherein the hydrocarbon feedstock comprises a heavy fraction comprising a boiling point greater or equal to 540° C.

\* \* \* \* \*